United States Patent
Cott et al.

(10) Patent No.: US 6,953,607 B2
(45) Date of Patent: Oct. 11, 2005

(54) POLAR ORDERING OF REACTIVE CHROMOPHORES IN LAYER-BY-LAYER NONLINEAR OPTICAL MATERIALS

(75) Inventors: Kevin Van Cott, Shawsville, VA (US); James R. Heflin, Jr., Blacksburg, VA (US); Harry Gibson, Blacksburg, VA (US); Richey M. Davis, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 93 days.

(21) Appl. No.: 10/286,954

(22) Filed: Nov. 4, 2002

(65) Prior Publication Data

US 2003/0113569 A1 Jun. 19, 2003

Related U.S. Application Data

(60) Provisional application No. 60/330,907, filed on Nov. 2, 2001.

(51) Int. Cl.$^7$ .............................................. B05D 5/06
(52) U.S. Cl. .................................. 427/430.1; 427/434.3
(58) Field of Search ............................ 427/430.1, 434.3

(56) References Cited

U.S. PATENT DOCUMENTS

| | | | | | |
|---|---|---|---|---|---|
| 5,208,111 A | * | 5/1993 | Decher et al. | ............... | 428/420 |
| 5,804,101 A | * | 9/1998 | Marder et al. | ............... | 252/582 |
| 6,033,773 A | * | 3/2000 | Yang et al. | ................. | 428/333 |
| 6,114,031 A | * | 9/2000 | Roberts et al. | ............. | 428/333 |
| 6,492,096 B1 | * | 12/2002 | Liu et al. | .................... | 430/324 |
| 2003/0113569 A1 | * | 6/2003 | Cott et al. | .................. | 428/515 |

* cited by examiner

*Primary Examiner*—D. Lawrence Tarazano
(74) *Attorney, Agent, or Firm*—Whitham, Curtis & Christofferson, PC

(57) ABSTRACT

Thin films exhibiting second-order nonlinear optical (NLO) properties, as well as materials and methods for producing such films, are provided. The films are formed by depositing, on a substrate, alternate layers of a polyelectrolyte and a low molecular weight chromophore. The chromophore contains an electrophilic group that reacts with a previously deposited polyelectrolyte, and ionizable groups which present absorption sites for the next polyelectrolyte layer. The films find application in, for example, electro-optic modulators and frequency doubling devices.

49 Claims, 5 Drawing Sheets

POLAR ORDERING OF REACTIVE CHROMOPHORES IN LAYER-BY-LAYER NONLINEAR OPTICAL MATERIALS

This application claims benefit to Provisional application Ser. No. 60/330,907, filed Nov. 2, 2001.

This invention was made using funds from grants from the National Science Foundation having grant number ECS-9907747. The government may have certain rights in this invention.

BACKGROUND OF THE INVENTION

1. Field of the Invention

The invention generally relates to thin films that exhibit second-order nonlinear optical (NLO) properties. In particular, the invention provides materials and methods for producing such films by forming, on a substrate, alternate layers of a polymer and a low molecular weight chromophore.

2. Background of the Invention

Materials that exhibit second-order nonlinear optical (NLO) properties are key components in electrooptic modulators and frequency-doubling devices. [1] Second-harmonic generation (SHG), in which incident light at one frequency is converted into light at twice that frequency, is one example of second-order NLO phenomena and is often used as an experimental probe of the second-order susceptibility $\chi^{(2)}$. A material must have a non-centrosymmetric structure to possess a nonzero $\chi^{(2)}$. Electrooptic modulators have traditionally employed ferroelectric inorganic crystals, such as lithium niobate or potassium dihydrogen phosphate, which are formed at high temperatures. However, organic NLO materials offer several advantages in performance, such as higher nonlinear susceptibilities, higher modulation rates, and potentially lower device fabrication costs. [2] Organic films exhibiting nonzero $\chi^{(2)}$ values have been fabricated using a variety of methods, including electric field poling, [3] Langmuir-Blodgett (LB) films, [4] and covalent self-assembly. [5] Both poled polymer systems and LB films have been made with non-centrosymmetric structures that exhibit relatively high values for $\chi^{(2)}$, but poor temporal or mechanical stability restrict their potential applications. [6] Deposition processes using reactive silane compounds require organic solvents and high temperatures. [5]

There is a large and growing body of literature on the use of layer-by-layer (LBL) methods for fabricating nanostructured films for a variety of applications. The LBL technique, which relies on purely electrostatic interactions, was first developed by Iler [7] and further elaborated upon by Decher et al. [8] Several research groups have demonstrated that the NLO films made by this technique have greater thermal and temporal stability than poled polymer systems. [9] A related approach that could be employed to fabricate NLO materials involves the use of low-molecular-weight dye molecules and polymers as film constituents. Yamada et al. made films of poly(diallyldimethylammonium chloride) and Erichrome Black T that exhibited an SHG intensity that increased only for the first five bilayers and then reached a plateau. [10] Koetse et al. [18] experimented with films grown with polyamines and reactive dyes but found that there was no polar order within the film layers. The authors indicate that the SHG signal they observed most likely originated from the dye molecules at the surface of the support. Other research groups have found that ionic interactions alone are not sufficient for constructing LBL films with low-molecular-weight chromophores. [11]

It would be of great benefit to have available stable NLO films with the large number of bilayers needed for electrooptic devices, and methods for their production. Further, it would be of benefit to have available a combination of low-molecular-weight chromophoric molecules and polymers that could be used to construct such films.

SUMMARY OF THE INVENTION

The present invention provides new materials and new methods to produce multilayer films with high second-order nonlinear optical (NLO) susceptibility ($\chi^{(2)}$) values.

In one embodiment, the invention provides a method of forming a multilayered nonlinear optical material. The method includes the steps of adsorbing a first species to the surface of a substrate to form a first species layer; attaching a chromophore to the first species layer to form a first chromophore layer; adsorbing the first species to the first chromophore layer to form a repeat first species layer; and attaching the chromophore to the repeat first species layer to form a repeat chromophore layer, and repeating this process multiple times. Alternatively, the order of deposition may be reversed, depending on the chemical composition of the components. In one embodiment, the first species is a polymer such as poly(allylamine hydrochloride) (PAH), polyvinylamine (PVA), poly-(l-lysine) (PLL), or poly(ethylene-imine) (PEI). In another embodiment, the first species is an organosilane or an alkanethiol compound. The adsorbing step may be performed under conditions whereby a covalent bond or a non-covalent bond (e.g. an ionic bond) is formed between the first species and the substrate. The method may further include the step of controlling the density of the first layer formed during the adsorbing step. The attaching step for the chromophore may be performed by forming a covalent bond between the chromophore and the first species of the first layer.

In a preferred embodiment, the chromophore is of a molecular weight ranging from about 100 to about 2000 atomic mass units, and the chromophore may be a monomer, for example, Procion Red MX5B, Procion Brown MX-GRN, or Procion Orange MX-2R, or a trichloro-s-triazine covalently bonded to a dye such as Mordant Brown 33, Acid Red 37, and Direct Orange 31. The first chromophore layer may exhibit noncentrosymmetry.

The method may further comprise the step of repeating the adsorbing and attaching steps multiple times. In addition, the first species in the first layer may be chemically or physically different from the first species in the repeat first species layer, and the first species in at least two of the repeat first species layers may be chemically or physically different from one another. The chromophore in the first chromophore layer may be chemically or physically different from the chromophore in the repeat chromophore layer, and the chromophore in at least two of the repeat chromophore layers may be chemically or physically different from one another.

The steps of attaching and adsorbing may be accomplished by submersion of the substrate into, respectively, a volume of the first species and a volume of the chromophore. Alternatively, the attaching and adsorbing steps may be accomplished by washing a solution of the first species or the chromophore over the substrate. The method may further comprise the step of removing the substrate after all steps are completed.

The invention further provides a film with high second-order nonlinear optical susceptibility. The film includes alternating layers of a polymer or a self-assembled monomer, and a low molecular weight chromophore. The alternating layers may be attached to a solid substrate through deposition of a first layer of the polymer or the self-assembled monomer onto the solid substrate. The solid substrate may comprise ionic groups or groups that can react with a self-assembled monolayer, and the deposition may occur through covalent or non-covalent self-assembly. The ionic groups may be negatively charged and the charged solid substrate may be comprised of material such as glass and silica.

The polymer or the self-assembled monomer may comprise ionic groups which are also nucleophilic, depending on the pH. The polymer may be an amine containing polymer such as poly(allylamine hydrochloride) (PAH), polyvinylamine (PVA), poly-(l-lysine) (PLL), or poly(ethyleneimine) (PEI).

The low molecular weight chromophore may be a monomer, and may comprise chemical moieties capable of covalently bonding to the polymer or the self-assembled monomer, and chemical moieties capable of binding ionically to the polymer or the self-assembled monomer. Such chemical moieties may be electrophilic moieties such as those with one or more triazine rings. The ionic moieties may be ionizable groups such as sulfonate, phosphate, carboxylate, or quaternary ammonium.

The film may display noncentrosymmetric order.

The invention also provides a second order NLO material comprising layers of a chromophore and layers of a polymer. The layers are held together by alternating covalent and non-covalent bonding between layers. The non-covalent bonds may be ionic, hydrophobic, or hydrogen bonds.

DETAILED DESCRIPTION OF THE PREFERRED EMBODIMENTS OF THE INVENTION

Applicants have discovered new materials and new methods to produce multilayer films with high second-order nonlinear optical (NLO) susceptibility ($\chi^{(2)}$ [19]) values. The films comprise alternating layers of a polymer and a monomeric chromophore. The polymer is deposited from solution onto the surface of a charged solid substrate, for example, by an ionic self assembly technique. The chromophore is then attached (e.g., covalently) to the immobilized polymer layer, forming an outer chromophore layer to which a subsequent polymer layer is then attached, and so on. By alternating the methods of deposition for each monolayer (e.g., covalent reaction alternated with electrostatic interaction) and decoupling the chromophore orientation from the steric constraints of a polymer chain (or high molecular weight and "bulky" sterochemistry in general), the non-centrosymmetric orientation required for nonzero $\chi^{(2)}$ values is achieved. The films thus formed possess high net polar ordering in each bilayer, and are useful for applications requiring films which display noncentrosymmetric order (e.g., various electrooptical applications).

Figure 1:
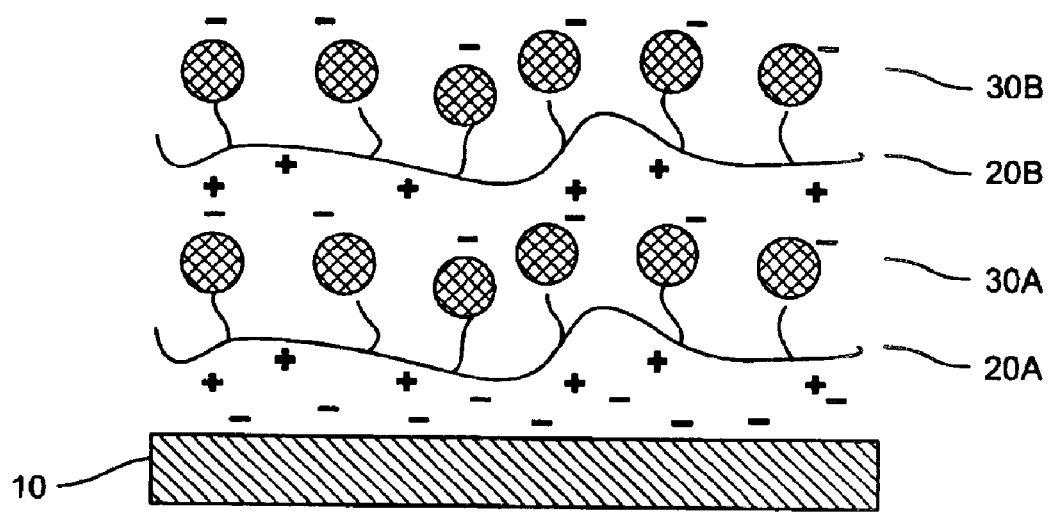
FIG. 1. Schematic representation of NLO thin film. 10=substrate; 20a=first polymer layer; 30a=first chromophore layer; 20b=second polymer layer; 30b=second chromophore layer.

A schematic representation of the film is given in FIG. 1, where a substrate 10 is depicted. A first layer of a polymer 20a is ionically attached to charged functional groups of the substrate. Next, a first layer 30a of a chromophore is covalently linked to the polymer layer, a second polymer layer 20b is ionically bonded to functional groups of the chromophore layer 30a, a second chromophore layer 30b is attached covalently to the second polymer layer 20b, and so on. The order of deposition may be reversed, depending on the chemical nature of the components and the substrate (i.e., chromophore-polymer-chromophore).

One indicator of high NLO is the level of second harmonic generation (SHG) exhibited by the film, as measured by the intensity of light generated at a wavelength which is one-half that of light incident on the film. In general, a film with "high" NLO will exhibit SHG $\chi^{(2)}$ value larger than about $5\times10^{-9}$ esu. Most preferably, the esu value will be in excess of at least about $30\times10^{-9}$ esu.

The methods involve providing a substrate onto which the film will be layered. Examples of suitable substrates include but are not limited to glass, silica, silicon wafers, indium tin oxide, other metal oxide surfaces, gold, other metal surfaces, polymer surfaces with charged groups such as: (1) carboxylic acids that form when a polymer surface is lightly oxidized, and (2) sulfonate groups that form on polystyrene surfaces that are subjected to a sulfonation reaction, etc. Those of skill in the art will recognize that substrates made of such materials will possess surface accessible functional groups to which complimentary groups of the polymer molecules (i.e., chemical moieties of the polymer capable of bonding with the functional groups of the substrate) will adsorb, i.e., will be physically or chemically attached. In a preferred embodiment, the functional groups of the substrate and the complementary functional groups of the polymer bear a charge and bond ionically. For example, the substrate may have surface accessible functional groups bearing a negative charge and the polymer may contain complementary groups which bear a positive charge. Alternatively, the substrate may have surface accessible functional groups bearing a positive charge and the polymer may contain complementary groups which bear a negative charge.

Those of skill in the art will recognize that the substrates on which the films are layered may be of many different forms, shapes and sizes, as suitable for a particular application. Examples include but are not limited to planar (flat), curved, spherical, irregular, circular, rectangular, cylindrical, and the like. For example, a planar substrate geometry is often used in fabricating electro-optic modulators. The substrate may be of any desired morphology, so long as it is of a material to which the initial polymer layer can be physically or chemically attached, and to which subsequent layers of chromophore and polymer can be added. Further, the polymer need not attach to the entire substrate (i.e., in some applications it may be preferable to build the layered structure on only a limited area of the substrate). Alternatively, more than one polymer may be bonded to the substrate (i.e., a mixture of polymers may be used, either concomitantly or one after the other) or different polymers may be used on different sections of the substrate to form a "pattern" of layers of the same or different compositions on the substrate, or different layers of a single film may be formed from different polymers and chromophores. Further, the substrate itself may be designed to be comprised of different materials in different areas, for example, to promote the binding of one type of electrolyte to one area, and a different electrolyte to another area, resulting in a pattern of films of different compositions on different areas of the substrate. The areas may be adjacent, or they may be spaced apart by areas with no NLO film. In addition, the film may be deposited on one or several surfaces of the substrate, e.g., on a front, back and sides of a planar substrate, or only on one or more of those surfaces. The film may also be deposited on one substrate and utilized in an application intact (i.e., the substrate and film constitute a unit which is utilized). Alternatively, the film may be removed from the original substrate on which it was deposited and utilized in an application without the substrate, or on another substrate. In preferred embodiments, such as that of an electro-optical modulator, the film is retained on the original substrate on which it was formed.

The first layer of the film is comprised of a polymer or other chemical species which is adsorbed to the substrate. The components in this layer could be polymers, or they could be smaller molecules, such as organosilane or alkanethiol compounds. Examples of positively charged polymers adsorbed to a negatively charged substrate (such as glass) include but are not limited to poly-(allylamine hydrochloride) (PAH), polyvinylamine (PVA), poly-(l-lysine) (PLL), and poly(ethylene-imine) (PEI). In a preferred embodiment, the attachment of the polymer to the substrate is via ionic bonding. Another example using monomeric molecules as components of the first layer would include, but not be limited to, organosilane reagents such as 3-aminopropyltrimethoxysilane. The adsorbed amount of polymer should be in the range of about 0.5 milligram adsorbed polymer per square meter of surface or higher, which corresponds roughly to one monolayer of adsorbed polymer. The density of the first layer may be controlled by any of several means, e.g., by adjusting the concentration of the polymer solution, the pH, the ionic strength, the time of exposure to the solution, the temperature, etc. Further, the density need not be the same for all layers. For example, the initial layer attached to the substrate may be of one density, whereas for a particular application, it may be preferable for subsequent polymer layers (those deposited on chromophore layers) to be more or less densely applied.

In order to form the multilayered film, a layer of chromophore molecules is attached to the first polymer layer. The chromophore is a molecule with a system of conjugated pi-bonds and contains two moieties that contribute to the layer-by-layer building of the film and the noncentrosymmetry: 1) chemical moieties capable of covalently bonding to functional groups on the underlying polymer layer and 2) chemical groups (e.g., ionizable groups) that present adsorption sites for the next polymer layer. In a preferred embodiment, the chromophore is deposited on the polymer layer by a covalent bonding reaction with suitable functional groups of the previously deposited polymer layer. For example, electrophilic groups contributed by the chromophore may form a covalent bond with nucleophilic groups of the polymer layer, or nucleophilic groups contributed by the chromophore may form a covalent bond with electrophilic groups of the polymer layer. The pH, temperature, or other properties of the deposition solutions may be used to control the reactivity between the nucleophilic and electrophilic species. Activating reagents may also be added to enhance the reactivity between the chromophore and polymer. Such covalent attachment serves to confer stability to the film and orientation of the chromophore.

If a reactive chromophore such as Procion Red MX5B is deposited by non-covalent bonding, there is very little polar ordering of the chromophore. The choice of the polymer is also important in conferring polar ordering on the chromophore. A polymer such as PAH confers polar ordering of Procian red MX5B, while a polymer such as PVBDA (Koeste et al. [18]) does not. Examples of groups which are suitable for covalent bonding in this manner include but are not limited to: for the polymer, amine, hydroxyl, sulfhydryl, carboxylate, aldehyde, epoxy, hydrazide, etc; and for the chromophore, mono- or di-chlorotriazine, vinyl sulfone, epoxy, carboxylate (after activation by a carbodiimide), amine, aldehyde, hydrazide, etc.

While in a preferred embodiment of the invention, the mode of attachment of the chromophore is covalent, other alternating adsorption mechanisms leading to chromophore orientation are possible, for example, mechanisms involving adsorption driven by ionic and hydrogen bonding interactions. As long as one functional group of the chromophore interacts with the polymer layer more strongly than another functional group of the chromophore, orientation of the chromophore on the surface onto which it is being deposited will result. For example, a chromophore with two different ionic groups each located at opposite "ends" of the chromophore (i.e., at distal portions of the molecule) could be absorbed with a preferred orientation due to the differing electrostatic interactions of the two groups with an oppositely charged surface such as that presented by the polymer layer. For example, one ionic group could be designed to interact with charged moieties on the polymer layer under one set of conditions (e.g. a certain pH) whereas the second ionic group would remain uncharged during deposition onto the polymer layer. After deposition, the second ionic group is, by virtue of being located on the "end" of the chromophore opposite to that which is bound to the polymer layer, oriented away from the layer and is relatively exposed. Conditions could then be altered to activate the second ionic group (e.g., a change in pH that causes ionization of that group) which would become capable of adsorbing the next layer of polymer.

In a preferred embodiment, the chemical groups of the chromophore that present adsorption sites for the next polymer layer are ionizable groups which, upon ionization, can undergo non-covalent bonding (for example, ionic bonding or hydrogen bonding) with suitable functional groups of a next polymer layer. Examples of such ionizable groups include but are not limited to sulfonate, phosphate, carboxylate, quaternary ammonium, etc. Such groups could bond with, for example, suitable charged groups located on an incoming polymer layer (e.g., a chromophore-sulfonate could interact with a polymer-quaternary ammonium).

In preferred embodiments, the chromophore which is utilized is a low molecular weight chromophore. By "low molecular weight chromophore" we mean a chromophore molecule with a molecular weight in the range of about 100 to about 2000 Atomic Mass Units (AMU). In some preferred embodiments, the chromophore is monomeric, i.e., the molecule contains a single repeat unit and is not linked to other chromophores by a polymer backbone. The purpose of utilizing a low molecular weight or monomeric chromophore is to allow greater flexibility with respect to the amount of orientation that can be introduced into the layers. When polymers that contain chromophores in the form of bulky side chains are utilized in the formation of thin film layers, steric hindrance puts limits on the amount of orientation that can be achieved. In contrast, low molecular weight chromophores (e.g., monomeric chromophores) do not have inherent steric hindrance to hinder attainment of a desired orientation. Examples of suitable low molecular weight chromophores that may be utilized in the practice of the present invention, include but are not limited to chromophores containing one or more triazine moieties, (e.g., Procion Red MX5B (CAS registry 17804-49-8), Procion Brown MX-GRN (CAS 68892-31-9), and Procion Orange MX-2R (CAS 70616-09-9), etc.

The present invention also provides new chromophores which fulfill the criterion of the chromophores described herein. In the novel chromophores, moieties capable of binding chemically to an existing polymer layer (e.g. electrophilic triazine moieties) and functional groups capable of providing adsorption sites for a subsequent layer of polymer (e.g., ionizable groups) are arranged to obtain a desired molecular size and shape, as well as to obtain a desired orientation of the reactive functional groups (e.g., the triazine and ionizable groups) for 1) attaching to the existing polymer layer and 2) receiving and bonding to an incoming polymer layer. In addition, the chromophores are designed so that the layer which they form displays sufficient non-centrosymmetry so that the film which is formed will exhibit a high level of NLO activity and stability adequate for desired applications. These include triazine derivatives synthesized from amino- or hydroxy- functional water-soluble dyes as outlined in Scheme 2.

Scheme 2.
reaction of water soluble dyes with trichloro-s-triazine.

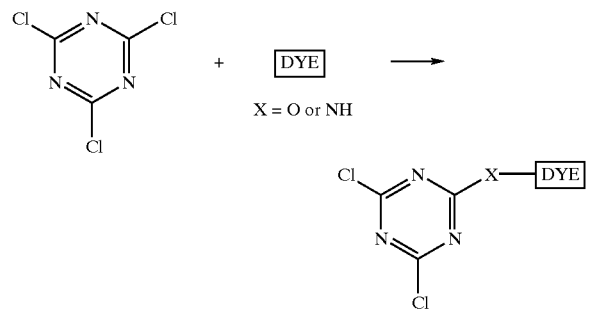

Figure 2A:
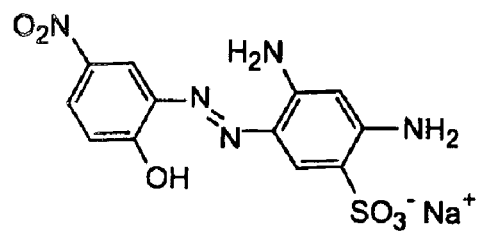
FIGS. 2A, B, and C. Molecular formula of A, Mordant Brown 33; B, Acid Red 37; and C, Direct Orange 31.
Figure 2B:
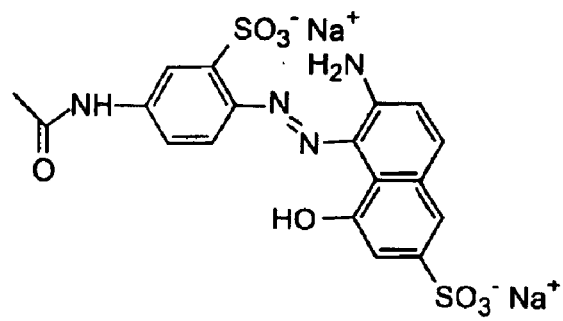
Figure 2C:
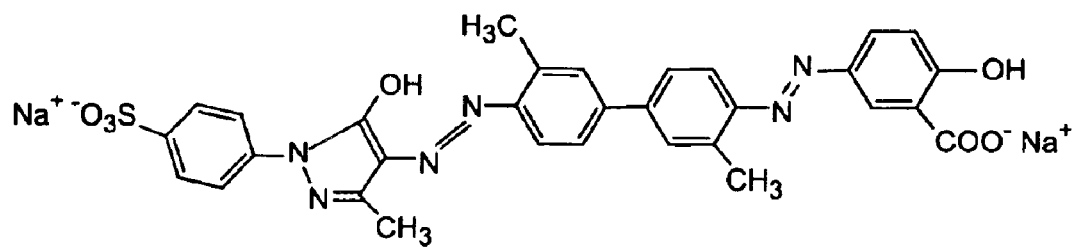
Figure 3:
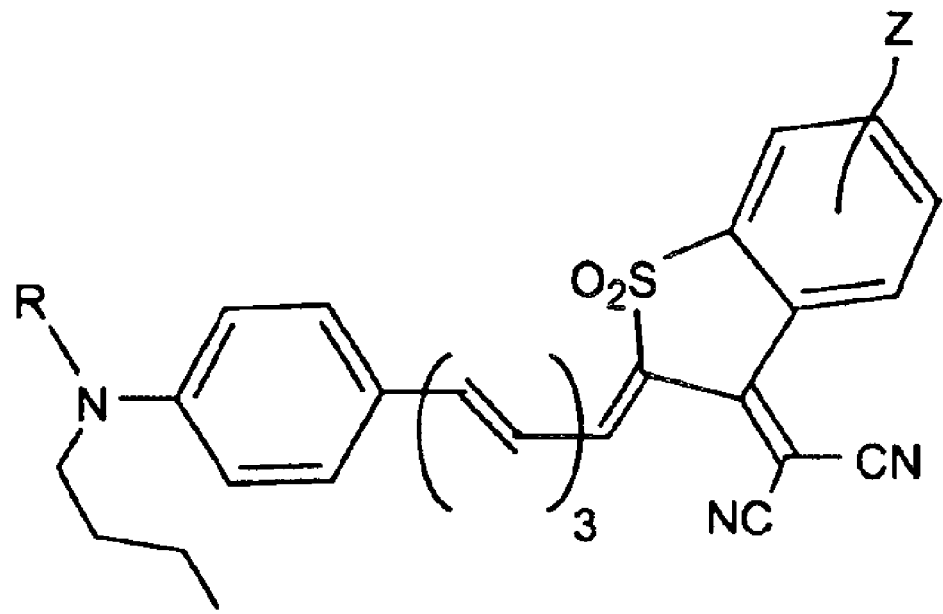
FIG. 3. Novel triazine-containing chromophore. R=Cl or O-alkyl.
Figure 3:
Figure 3:
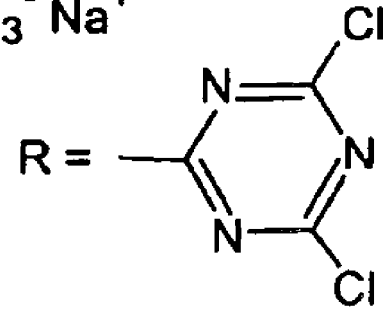
Figure 3:

Examples of prototype systems are Mordant Brown 33, Acid 37 and Direct Orange 31, all of which are commercially available (CI 13250, 17045, and 23655, respectively) (FIGS. 2A–C). Based on known NLO-molecular structure paradigms (i.e., long conjugation length and electron-donating and electron-withdrawing groups at opposing ends of the molecule) [1,2] new dyes may be synthesized with the requisite functionalities, including the optimal number and location of sulfonic acid groups, to maximize the NLO effect. A proposed monosulfonate example a is shown in FIG. 3, the parent molecule b of which has a $\beta\mu$ value of $60,000\times10^{-48}$ esu [3], 75 times that of Disperse Red I.

The density of chromophore deposition may be controlled by any of several means, e.g., by adjusting the concentration of the chromophore solution, the density of reacting groups in the underlying polymer layer, the time of exposure to the chromophore solution, the temperature of the reaction, the ionic strength and pH of the chromophore solution, etc. Further, the density need not be the same for all chromophore layers in the multilayered film. The density or concentration of chromophore in a layer of a film or in the film as a whole may be determined by measuring the absorbance of the film in the UV or visible region at a wavelength characteristic of the chromophore.

In a preferred embodiment of the invention, deposition of the molecule of interest (i.e. the polymer or the chromophore) is accomplished by exposure of the substrate to an aqueous solution containing the molecule to be deposited. However, those of skill in the art will recognize that the solution need not be strictly aqueous. Solvent systems containing organic modifiers (such as, but not limited to, surfactants, cyclodextrins, or solvents such as methanol, acetonitrile, etc.) may also be used to form solutions of the polymer or the chromophore, so long as the solution effectively solubilizes the molecule of interest, makes the molecule available for deposition on the substrate (and/or on previous layers), and does not have deleterious interactions with the molecules of interest or the substrate. In general, the concentration of the polymer in such a solution will be preferably in the range of about 0.01 to about 0.1 Mole of repeat unit/liter; and the concentration of the chromophore in such a solution will be in the range of about 0.1 to about 10 weight percent, and preferably in the range of about 1 to about 5 weight percent. In addition, the solutions containing the molecules for deposition may contain other substances of benefit to the deposition process, such as salts or organic modifiers. Further, the pH of the solutions may be adjusted so as to optimize the deposition procedure and/or the chemical reaction between the functional groups of the substrate, polymer, or chromophore. For example, if the functional group of a chromophore that bonds to suitable chemical groups of an incoming polymer is an ionizable amine, the pH of the solution may be adjusted to ensure that most of the amine groups are protonated, thus promoting reaction between the ionized group and the polymer.

Those of skill in the art will recognize that many techniques for carrying out exposure of the substrate (or substrate plus additional layers) to the polymer exist and are well known. Examples include but are not limited to: submersion of the substrate into a liquid solution of the molecule of interest, washing a solution of the molecule over the surface of the substrate, applying a solution of the molecule by spraying, submersion of the substrate into an electrochemical cell containing a liquid solution of the polymer and using an electrical field to help drive deposition, applying drops of the solution to a spinning substrate (i.e., spin-casting), and the like. Any method of exposing the substrate to solutions containing a molecule of interest (the molecule to be deposited) may be utilized, so long as the process results in sufficient deposition of the desired molecule.

Further, the precise mechanics of handling the deposition process (e.g., exposure of a substrate to a solution of the molecule of interest, washing or rinsing and/or drying or curing of the substrate plus attached layers between steps of deposition or after completion of deposition, etc.) may vary from case to case, due to, for example, the identity of the polymer and the chromophore and the intended application of the device in which the film is to be employed, the nature of the substrate (e.g., size and shape) on which the film is built up, the scale of the operation in which the films are formed, thickness of the film, and the like. Information regarding suitable techniques for deposition procedures are readily available and well-known to those of skill in the art. For example, see references [20], [21] and [22].

In preferred embodiments, the layering process of the present invention is carried out at ambient temperature e.g., at "room temperature" (roughly 25° C.). However, those of skill in the art will recognize that the deposition process may be carried out at a wider range of temperatures, preferably at from about 4 to about 80 degrees.

The time for carrying out the deposition of an individual layer may vary from formulation to formulation, depending on, for example, the molecule (e.g., polymer or chromophore) being deposited, the composition of the solution from which deposition occurs, the nature of the substrate, the desired density of deposition, and the like. Such factors are well-understood by those of skill in the art. For example, see references [20], [21] and [22]. However, in general, the time required for deposition will be on the order of about 1 to about 60 minutes, and preferably from about 2 to about 5 minutes. In the examples provided below, chromophore deposition was complete within about 2–3 minutes.

The desired quantity or density of a molecule of interest to be deposited in an individual layer may vary from case to case, depending on, for example, the intended application of the film; the nature of the polymers, chromophores and substrates, etc. In general, the amount of polymer deposited may vary from about 0.5 to about 5 milligram of deposited polymer per square meter of substrate area.

The steps of depositing a layer of polymer (such as a polyelectrolyte), then depositing a layer of chromophore onto the polymer layer, then depositing another layer of polymer onto the chromophore layer, etc., can continue as described until the desired thickness of number of layers is attained. The number of layers to be deposited and the final thickness of the film may vary from situation to situation. In general, the number of layers will be in the range of about 2 to about 500, and the thicknesses will range from about 0.5 nm/bilayer to about 10 nm/bilayer. For example, for use in an electro-optic modulator, a film of about 1 to about 10 microns is desirable. In a preferred embodiment of the present invention, the bilayer thickness is about 0.5 nm.

The films of the present invention may be utilized in any of a variety of electrooptical applications, including but not limited to electro-optic modulators, switches, directional couplers, and piezoelectric and pyroelectric devices, and the like. In such applications, the required strength of electrical signals could be decreased. Poled polymer devices have been demonstrated with complete modulation at less than 1 volt (this voltage is often referred to as "$V_\pi$" and generally it is desired to make it as small as possible, preferably less than 1 volt) applied to the device at speeds greater than 100 GHz. However, such devices suffer from stability problems which have been overcome by the films of the present invention.

The invention also provides a second order NLO material formed of layers of a chromophore and layers of a polymer. The layers are joined together by alternating covalent and non-covalent bonding between layers. Types of non-covalent bonding are ionic, hydrophobic, and hydrogen bonding. The material may be formed on a substrate, and, depending on the particular type of material that is being formed, the first layer that is deposited on the substrate may be a polymer layer, or the first layer that is deposited on the substrate may be a chromophore layer. The nature of potential substrates, polymers and chromophores is as discussed above.

A further type of second order NLO material is one in which the layers are formed from alternating layers of chromophore and polymer. However, in this material the layers are joined together by ionic bonding. The chromophore contains two different types of ionic functional groups, one of which is un-ionized (masked) under a condition in which the other is ionized (nucleophilic). To form such a material, the polymer is deposited on a substrate, and the resulting polymer layer is exposed to and allowed to react with the chromophore under conditions in which one ionic group of the chromophore is ionized and the other ionic group is not. For example, the reaction may be carried out at a pH at which one ionic functional group is protonated (and therefore charged) but at which a second ionic functional group is not protonated and is therefore neutral. The reaction is allowed to proceed and the chromophore is deposited on the polymer layer via ionic bonding between reactive ionic groups of the polymer and the reactive ionic groups of the chromophore. A chromophore layer is thus formed. The deposited chromophore layer is then exposed to a polymer solution under conditions in which the previously un-ionized (masked) ionic functional groups of the chromophore are ionized (unmasked) e.g. by changing the pH to effect protonation of the unprotonated ionic functional groups. The unmasked ionic groups then provide sites for adsorption of an additional layer of polymer via ionic bonding. Following this, yet another layer of chromophore (again with both ionized and un-ionized ionic functional groups) may be deposited on the outermost polymer layer via ionic bonding between the reactive functional groups of the chromophore and ionic groups of the polymeric layer. Conditions are again changed to unmask the un-ionized ionic functional groups of the outermost chromophore layer, which is then reacted with additional polymer, and so on. The process is repeated until the desired number of layers and/or the desired depth of the layered material is achieved. Alternatively, the first layer (i.e. the layer that is deposited directly on the substrate) may be a chromophore layer. In this case, the chromophore is attached to the substrate via ionic bonding with reactive ionic groups of the chromophore, followed by unmasking of unreactive ionic groups, deposition of a polymer layer, and so on, as described above.

Further description of the invention is found in the foregoing non-limiting Examples.

EXAMPLES

Materials and Methods

Figure 4A:
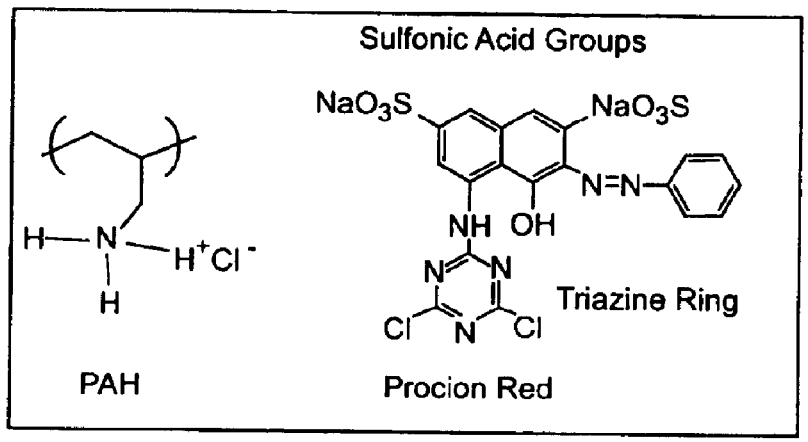
FIGS. 4A and B. A: depiction of polyallylamine hydrochloride (PAH) and Procion Red dye (PR). B: Schematic of PAH ionically bonded to a substrate, and covalent attachment of PR to the PAH layer.

Procion Red (PR, Aldrich) and poly(allylamine hydrochloride) (PAH; $M_W$ ca.70000, Aldrich) were used as received (see FIG. 4A). Glass microscope slides (Fisher Scientific) were used as the substrates and prepared by using the RCA cleaning procedure. [16] Solutions of PAH (10 mm, based on the monomer) and solutions of PR (25 mm) in deionized water were used in all experiments. The pH values of the solutions were adjusted with HCl or NaOH. The immersion time in PAH was 5 min, with the exception of the first layer, which was immersed for 10 min. The immersion time in PR was 10 min. The substrates were rinsed thoroughly with deionized water between immersions. The slides were dried after every ten bilayers with $N_2$. For each set of conditions, a series of five slides was made with a total of 2, 10, 20, 40, and 60 bilayers (counting both sides). Absorbance and SHG measurements took into account the films deposited on both sides of the substrate, while ellipsometry measurements were made with films deposited on only one side. Absorption measurements were made with a Hitachi U-2000 spectrophotometer at a wavelength of 538 nm and were taken every ten bilayers during the deposition process. Film thicknesses were measured with a variable-angle spectroscopic ellipsometer (J. A. Woolam Ellipsometer VB-200). Ellipsometric data were obtained from the unfrosted face of the slide, as the scattering eliminates backside reflections and simplifies data analysis. The amplitude factor ($\psi$) and phase factor ($\Delta$), which are related to the complex Fresnel coefficients for any given film, [17] were measured for wavelengths from 350 to 1000 nm at 10 nm intervals. This wavelength range was repeated for angles ranging from 55 to 75° in 5° intervals.

SHG measurements were performed with a standard setup using a 10-ns pulse-width, Q-switched Nd:YAG laser with a fundamental wavelength of 1064 nm. The SHG data were averaged over 100 shots per data point, and the uncertainty in the relative $\chi^{(2)}$ values is 10%. Typical spot radius and pulse energy values were 30 $\mu$m and 7 mJ pulse$^{-1}$, respectively. The film was deposited on both sides of the substrate. As a result, as the sample was rotated with respect to the incident beam, the path length between the films on opposite sides was varied, which led to interference fringes of the SHG intensity. The sample was rotated from 30 to 60° away from normal incidence using a stepper-motor-controlled rotation stage. The $\chi^{(2)}$ values were determined from the peak of the interference fringe in the vicinity of 45°. By comparison to Maker fringes in a quartz crystal wedge, the $\chi^{(2)}$ value of a film was obtained from equation 10

$$\frac{\chi^{(2)}_{film}}{\chi^{(2)}_q} = \frac{2l_{cq}}{\pi l_{film}}\sqrt{\frac{I^{2\omega}_{film}}{I^{2\omega}_q}}$$

where $l_{film}$ is the total path length through the film, the coherence length of quartz ($l_{c,q}=\lambda/4(n^{2w}-n^w)$) is 22.4 $\mu$m, and the $\chi^{(2)}$ value of quartz is $1.92 \times 10^{-9}$ esu.

Example 1

Figure 4B:
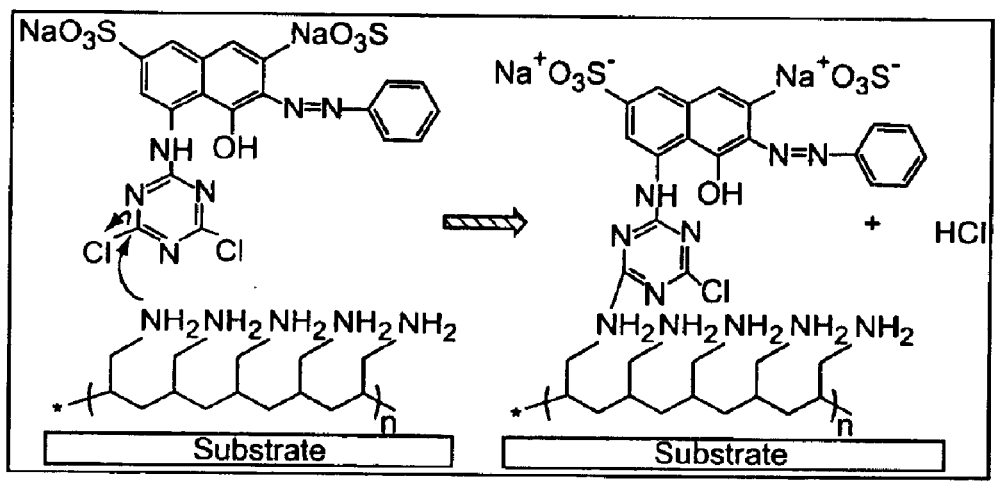
Figure 5A:
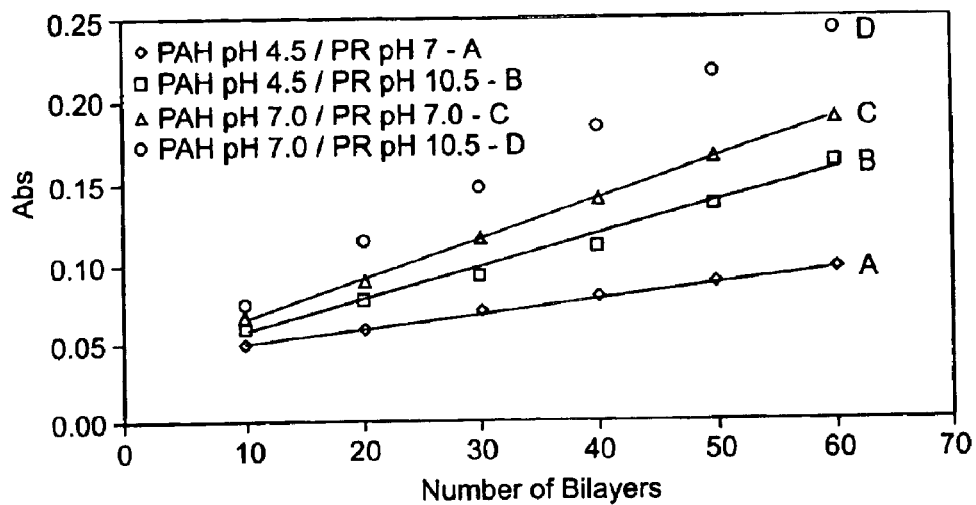
FIGS. 5A, B and C. A: Absorbance (A) at 538 nm as a function of the number of bilayers (n) in PR-PAH films. Experimental conditions for A–D correspond to entries in Table 1. Lines are obtained by linear regression analysis. ◇=PAH pH 4.5/PR pH 7.0; □=PAH pH 4.5/PR pH 10.5; △=PAH pH 7.0/PR pH 7.0; ○=PAH pH 7.0/PR pH 10.5. B: In situ SHG measurement of the reactive coupling of PR onto PAH. C: Square root of the SHG intensity $(I_{2\omega})^{1/2}$ as a function of the number of bilayers for films with experimental conditions for A–D corresponding to Table 1. Lines are obtained by linear regression analysis. ◇=PAH pH 4.5/PR pH 7.0; □=PAH pH 4.5/PR pH 10.5; △=PAH pH 7.0/PR pH 7.0; ○=PAH pH 7.0/PR pH 10.5.
Figure 5B:
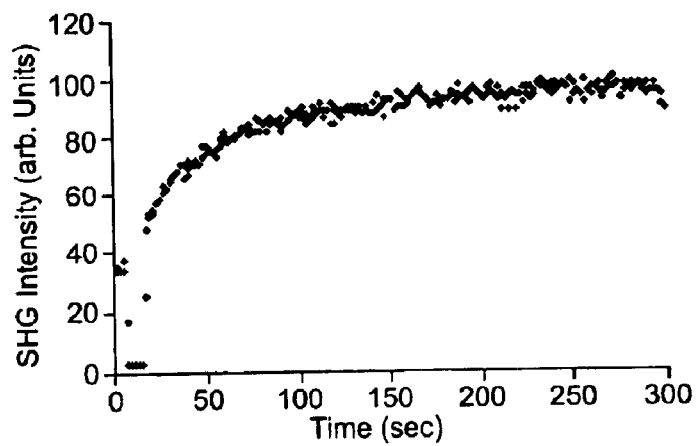

The model anionic/reactive species used in this study was Procion Red MX-5B (PR), and the NLO-inactive polycation was poly(allylamine hydrochloride) (PAH) The layering of PAH and PR onto a substrate is depicted schematically in FIG. 4B. The pH values of the dipping solutions determine the ionization state of the amine moieties on PAH, which affects both the conformation of the polymer upon adsorption and its subsequent reactivity with PR. Efficient electrostatic deposition of PAH requires that the pH value of the PAH solution is maintained near or below the pKa value of the amino group (8.7), [12] where the majority of the $NH_2$ groups will be protonated and available for interaction with negative charges on the substrate or the PR molecule. The pH value of the PR solution must be near or above the pKa value of the PAH amine groups for efficient covalent attachment of the chromophore to the dichlorotriazine ring at room temperature. [13] In situ measurements of SHG intensity during PR deposition showed that each monolayer was deposited within two minutes at room temperature. Successful film growth was characterized by a linear increase in the absorbance and thickness with the number of bilayers deposited (FIG. 5A and Table 1). The pH value of the PAH solutions in these experiments was held at either 4.5 or 7.0. The positive charges along the PAH chain strongly repel each other and are strongly attracted to the negatively charged surface. These two effects lead to the deposition of PAH in layers with a bilayer thickness less than 1 nm. Chromophore deposition was complete within 2 to 3 minutes (FIG. 5B).

TABLE I

Properties of films made by a hybrid deposition process from Procion Red (PR) and poly(allylamine hydrochloride) (PAH).

| Expt | PAH pH | PR pH | $An_b^{-1}$[a] | $t_b$[nm][b] | $\chi^{(2)}$ [$\times 10^9$ esu][e] | Rel. $An_b^{-1}$[c] | Rel. $(I_{2\omega})^{1/2} N_b^{-1}$[c] |
|---|---|---|---|---|---|---|---|
| A | 4.5 | 7.0 | $(8.9 \pm 0.1) \times 10^{-4}$ | [d] | — | — | — |
| B | 4.5 | 10.5 | $(2.0 \pm 0.1) \times 10^{-3}$ | $0.34 \pm 0.02$ | $11.2 \pm 0.1$ | 1.00 | 1.00 |
| C | 7.0 | 7.0 | $(2.3 \pm 0.4) \times 10^{-3}$ | $0.55 \pm 0.05$ | $1.2 \pm 0.01$ | 1.15 | 0.17 |
| D | 7.0 | 10.5 | $(3.3 \pm 0.3) \times 10^{-3}$ | $0.52 \pm 0.06$ | $11.3 \pm 0.1$ | 1.63 | 1.55 |

[a]A = absorbance at 538 nm; $n_b$ = number of bilayers as determined by linear regression analysis.
[b]$t_b$ = thickness per bilayer as determined by ellipsometry.
[c]Relative values of the slopes obtained by linear regression analysis of each series in FIG. 1 and 2 relative to experiment B.
[d]Too thin to measure.
[e]For quartz, $\chi^{(2)} = 1.92 \times 10^{-9}$ esu.

Figure 5C:
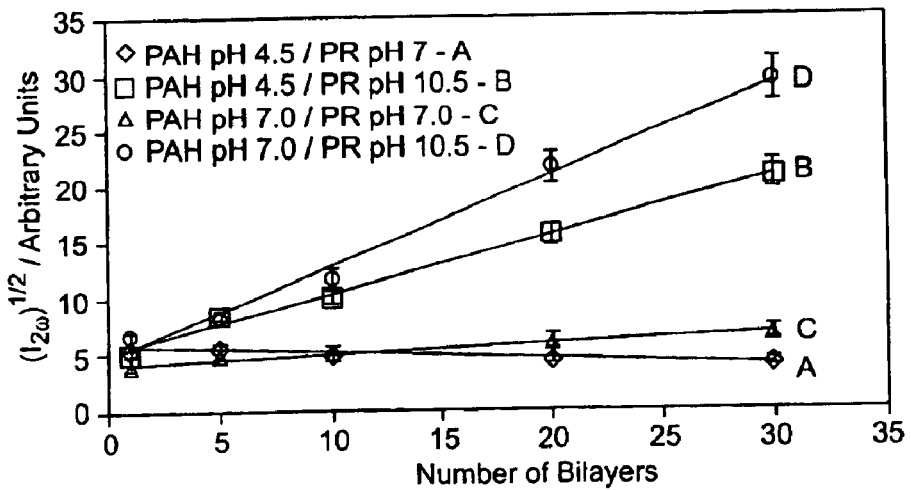

The pH value of the PR solution has a significant effect on the amount of chromophore incorporated into the film. When the pH value of the PAH solution was held constant at 4.5 or 7.0 and that of the PR solution was increased from 7.0 to 10.5, the amount of PR deposited per bilayer increased, which is consistent with the increased covalent-coupling efficiency. When the pH value of the PR solution was 10.5 and that of the PAH solution was increased from 4.5 to 7.0 (compare experiments B and D), a statistically insignificant increase in the film thickness per bilayer (p>0.05) was observed. However, this also resulted in a small but significant increase in the amount of PR deposited per bilayer (p<0.05), as measured by the absorbance per bilayer. Importantly, the pH value of the PR solutions affects the degree of ordering of the chromophore molecules in the film. When the film thickness is much less than the SHG coherence length (typically a few microns), the SHG should have a quadratic dependence on the film thickness. The linear dependence of the square root of the SHG intensity (($I_{2\omega})^{1/2}$) on the number of bilayers for the films fabricated with a PR solution at pH 10.5 thus demonstrates there is equivalent polar ordering in each successive bilayer (FIG. 5C: lines B and D). When the pH value of the PR solution is held constant at 10.5, an increase in the pH value of the PAH solution from 4.5 to 7.0 results in an increase in the absorbance per bilayer (FIG. 5A and Table 1, lines B and D). The value of $(I_{2\omega})^{1/2}$ per bilayer also increases by a similar relative amount and the $\chi^{(2)}$ value of the films is similar, which indicates that for these conditions the increase in SHG is simply a result of the incorporation of more PR. When the pH value of the PAH solution is held constant at 7.0 and that of the PR solution changes from 7.0 to 10.5, the bilayer thickness is similar, but the absorbance per bilayer and the $\chi^{(2)}$ value all increase. While 42% more PR is incorporated per bilayer, the values of $(I_{2\omega})^{1/2}$ per bilayer and $\chi^{(2)}$ increase approximately eightfold. The $\chi^{(2)}$ values for films made with the PR solution at pH 10.5 are six times greater than that of quartz.

The dependence of the values of $\chi^{(2)}$ and $(I_{2\omega})^{1/2}$ per bilayer on the pH value of the PR solution indicates that the mechanism of PR deposition has a dramatic effect on the orientation of the PR molecules in the film. For the films made with a PR solution at pH 7.0 (experiments A and C), there is a much weaker dependence of the SHG intensity on the number of bilayers and a much lower $\chi^{(2)}$ value, which indicates a lower degree of molecular ordering of the PR molecules. At pH 7, the reactivity of the PAH amine groups with the triazine ring of the PR is lower, and PR may be incorporated by a combination of electrostatic, hydrogen bonding, and covalent interactions. Thus at conditions favoring a covalent reaction between PR and PAH, a high degree of ordering of the PR molecules results, while under unfavorable conditions, the PR deposited within the films has a more random orientation. We interpret the larger $\chi^{(2)}$ value and SHG observed in the deposition of PR at pH 10.5 as confirmation of our hypothesis that alternating the mechanism of deposition in these films and decoupling of the chromophore from steric constraints of a polymer backbone provides a route to low-molecular-weight chromophores. In our earlier studies with polymeric dyes bearing NLO-active chromophores as charged pendant groups, films were made under deposition conditions leading to relatively thin bilayers (ca. 0.2 nm). [14] We found by measuring SHG intensity in situ during deposition that the polar ordering of an adsorbed chromophore layer is reduced by subsequent adsorption of the next polyelectrolyte monolayer. [15] Decoupling the NLO-active chromophore from a polymer chain reduces the steric constraints for ordering that are present when using a large chromophoric side group. Additionally, competing intermolecular interactions that prevent the achievement of a high net polar ordering of the chromophore within the film can be minimized by using a bifunctional. chromophore with which the mechanism for deposition (covalent bonding) differs from the deposition of the polymeric component (electrostatic interaction).

This example demonstrates new methodology for making organic LBL films with non-centrosymmetric ordering of low-molecular-weight chromophores in each bilayer and significant $\chi^{(2)}$ values.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

References

[1] R. W. Boyd, Nonlinear Optics, Academic Press, San Diego, 1992.

[2] a) Y. Shi, C. Zhang, H. Zhang, J. Bechtel, L. Dalton, B. Robinson, W. Steier, Science 2000, 288, 119–122; b) L. Dalton, A. Harper, R. Ghosn, W. Steier, M. Ziari, H. Fetterman, Y. Shi, R. Mustacich, A. Jen, K. Shea, Chem. Mater. 1995, 7, 1060–1081.

[3] D. Burland, R. Miller, C. Walsh, Chem. Rev. 1994, 94, 31–75.

[4] G. Ashwell, J. Mater. Chem. 1999, 9, 1991–2003.

[5] a) W. Lin, S. Yitzchaik, W. Lin, A. Malik, K. Durbin, A. Richter, G. Wong, P. Dutta, T. Marks, Angew. Chem. 1995, 107, 1646–1649; Angew. Chem. Int. Ed. Engl. 1995, 34, 1497–1499; b) H. Katz, G. Scheller, T. Putvinski, M. Schilling, W. Wilson, C. Chidsey, Science 1991, 254, 1485–1487.

[6] M. J. Roberts, G. A. Lindsay, J. D. Stenger-Smith, R. A. Hollins, A. P. Chafin, R. F. Gratz, Thin Solid Films 1998, 327–329, 5–8;b) C. Samyn, T. Verbiest, A. Persoons. Macromol. Rapid Commun. 2000, 21, 1–15.

[7] R. J. Iler, J. Colloid Interface Sci. 1966, 21, 569–594.

[8] G. Decher, Y. Lvov, J. Schmitt, Thin Solid Films 1994, 244, 772–777.

[9] a) Y. Lvov, S. Yamada, T. Kunitake, Thin Solid Films 1997, 300, 107–110; b) X. Wang, S. Balasubramanian, L. Li, X. Jiang, D. Sandman, M. F. Rubner, J. Kumar, S. K. Tripathy, Macromol. Rapid Commun. 1997, 18,451±453; c) J. R. Heflin, C. Figura, D. Marciu, Y. Liu, R. O. Claus, Appl. Phys. Lett. 1999, 74, 495–497; d) G. A. Lindsay, M. Roberts, A. Chafin, L. Hollins, L. Merwin, J. Stenger-Smith, Y. Yee, P. Zarras, K. Wynne, Chem. Mater. 1999, 11, 924–929.

[10] S. Yamada, A. Harada, T. Matsuo, S. Ohno, I. Ichinose, T. Kunitake, Jpn. J. Appl. Phys. 1997, 36, L1110–L1112.

[11] S. Das, A. Pal, Langmuir 2002, 18, 458–461.

[12] M. Fang, C. Kim, G. Saupe, H. Kim, C. Waraksa, T. Miwa, A. Fujishima, T. Mallouk, Chem. Mater. 1999, 11, 1526–1532.

[13] G. T. Hermanson, Bioconjugate Techniques, Academic Press, New York, 1996.

[14] C. Figura, P. J. Neyman, D. Marciu, C. Brands, M. A. Murray, S. Hair, R. M. Davis, M. B. Miller, J. R. Heflin, SPIE Proc. 2000, 3939, 214–222.

[15] C. Brands, P. Neyman, M. T. Guzy, S. Shah, R. M. Davis, K. E. Van Cott, H. Wang, H. W. Gibson, J. R. Heflin, SPIE Proc. 2001, 4461, 311–318.

[16] M. Itano, F. Kern, M. Miyashita, T. Ohmi, Semiconductor Manufacturing, IEEE Transactions, 1993, 6, 258–267.

[17] R. M. Azzam, N. M. Bashara, Ellipsometry and Polarized Light, Elsevier, New York, 1987.

[18] Koetse M, Laschewsky A. Verbiest T. Films grown from polyamines and reactive dyes by alternating polyelectrolyte adsorption/surface activation (CoMPAS). Materials Science and Engineering C. 1999; 10:107–113.

[19] Advincula et al. Chem Mater. 2001: 13: 2870–2878.

[20] Ariga K, Lvov Y, Kunitake T. 1997. J. Am Chem. Soc. 119: 2224–2231.

[21] Hammond, P. 2000. Current Opinion in *Colloid & Interface Science*, vol. 4, pp. 430–442.

[22] Decher, G. 1997. Science 277:1232–1237.

We claim:

1. A method of forming a multilayered nonlinear optical material, comprising the steps of:
   a) adsorbing a first species to the surface of a substrate to form a first species layer;
   b) attaching a chromophore to said first species layer to form a first chromophore layer;
   c) adsorbing said first species to said first chromophore layer to form a repeat first species layer; and
   d) attaching said chromophore to said repeat first species layer to form a repeat chromophore layer, wherein layers of said multilayered nonlinear optical material are held together by alternating covalent and non-covalent bonding between said layers.

2. The method of claim 1 wherein the first species is a polymer.

3. The method of claim 2 wherein the polymer is selected from the group consisting of poly(allylamine hydrochloride) (PAH), polyvinylamine (PVA), poly-(l-lysine) (PLL), and poly(ethylene-imine) (PEI).

4. The method of claim 1 wherein the first species is a monomeric compound selected from the group consisting of organosilane compounds and alkanethiol compounds.

5. The method of claim 1 wherein said adsorbing step a) is performed under conditions whereby an ionic bond is formed between said first species and said substrate.

6. The method of claim 1 further comprising the step of controlling the density of said first species layer.

7. The method of claim 1 wherein said attaching steps are performed by forming a covalent bond between said chromophore and said first species.

8. The method of claim 1 wherein said chromophore is of a molecular weight ranging from 100 to 2000 atomic mass units.

9. The method of claim 1 wherein said chromophore is a monomer.

10. The method of claim 9 wherein said chromophore is selected from the group consisting of Procion Red MX5B, Procion Brown MX-GRN, and Procion Orange MX-2R.

11. The method of claim 9 wherein said monomer is a trichloro-s-triazine covalently bonded to a dye.

12. The method of claim 11 wherein said dye is selected from the group consisting of Mordant Brown 33, Acid Red 37, and Direct Orange 31.

13. The method of claim 9 wherein said monomeric chromophore comprises
   i) chemical moieties capable of covalently bonding to said first species layer or said repeat first species layer; and
   ii) chemical moieties capable of binding ionically to said first species layer or said repeat first species layer.

14. The method of claim 13 wherein said chemical moieties capable of covalently bonding comprise one or more triazine rings.

15. The method of claim 13 wherein said chemical moieties capable of binding ionically are ionizable groups selected from the group consisting of sulfonate, phosphate, carboxylate, and quaternary ammonium.

16. The method of claim 1 further comprising the step of controlling the density of said chromophore layer by adjusting the ionic strength of a reaction mixture in which said steps of said method are carried out.

17. The method of claim 1, wherein said non-covalent bonding is selected from the group consisting of ionic bonding, hydrophobic bonding, and hydrogen bonding.

18. The method of claim 1 wherein said first chromophore layer exhibits noncentrosymmetry.

19. The method of claim 1 further comprising the step of repeating steps c) and d) multiple times.

20. The method of claim 1 wherein said first species in said first species layer is chemically or physically different from said first species in said repeat first species layer.

21. The method of claim 19 wherein said first species in at least two of said repeat first species layers are chemically or physically different from one another.

22. The method of claim 1 wherein said chromophore in said first chromophore layer is chemically or physically different from said chromophore in said repeat chromophore layer.

23. The method of claim 19 wherein said chromophore in at least two of said repeat chromophore layers are chemically or physically different from one another.

24. The method of claim 1 wherein each of said attaching and adsorbing steps are accomplished by submersion of said substrate into, respectively, a volume of said first species and a volume of said chromophore.

25. The method of claim 1 wherein each of said attaching and adsorbing steps are accomplished by washing a solution of said first species or said chromophore over said substrate.

26. The method of claim 1 further comprising the step of removing said substrate after steps a)–d) are completed.

27. A method of forming a multilayered nonlinear optical material, comprising the steps of:
   a) attaching a chromophore to the surface of a substrate to form a first chromophore layer;
   b) adsorbing a first species to said first chromophore layer to form a first species layer;
   c) attaching said chromophore to said first species layer to form a repeat chromophore layer; and
   c) adsorbing said first species to said repeat chromophore layer to form a repeat first species layer, wherein layers of said multilayered nonlinear optical material are held together by alternating covalent and non-covalent bonding between said layers and wherein said step of attaching said chromophore to said first species layer is performed by forming a covalent bond between said chromophore and said first species.

28. The method of claim 27 wherein the first species is a polymer.

29. The method of claim 28 wherein the polymer is selected from the group consisting of poly(allylamine hydrochloride) (PAH), polyvinylamine (PVA), poly-(l-lysine) (PLL), and poly(ethylene-imine) (PEI).

30. The method of claim 27 wherein said adsorbing step a) is performed under conditions whereby an ionic or covalent bond is formed between said chromophore and said substrate.

31. The method of claim 27 further comprising the step of controlling the density of said first species layer.

32. The method of claim 27 wherein said attaching step is performed by forming a covalent bond between electrophilic groups in said chromophore and nucleophilic groups in said first species of said first layer.

33. The method of claim 27 wherein said chromophore is of a molecular weight ranging from 100 to 2000 atomic mass units.

34. The method of claim 27 wherein said chromophore is a monomer.

35. The method of claim 34 wherein said chromophore is selected from the group consisting of Procion Red MX5B, Procion Brown MX-GRN, and Procion Orange MX-2R.

36. The method of claim 34 wherein said monomer is a trichloro-s-triazine covalently bonded to a dye.

37. The method of claim 36 wherein said dye is selected from the group consisting of Mordant Brown 33, Acid Red 37, and Direct Orange 31.

38. The method of claim 27 wherein said first chromophore layer and said repeat chromophore layer exhibit noncentrosymmetry.

39. The method of claim 27 further comprising the step of repeating steps c) and d) multiple times.

40. The method of claim 27 wherein said first species in said first species layer is chemically or physically different from said first species in said repeat first species layer.

41. The method of claim 40 wherein said first species in at least two of said repeat first species layers are chemically or physically different from one another.

42. The method of claim 27 wherein said chromophore in said first chromophore layer is chemically or physically different from said chromophore in said repeat chromophore layer.

43. The method of claim 42 wherein said chromophore in at least two of said repeat chromophore layers are chemically or physically different from one another.

44. The method of claim 30 wherein each of said attaching and adsorbing steps are accomplished by submersion of said substrate into, respectively, a volume of said first species and a volume of said chromophore.

45. The method of claim 30 wherein each of said attaching and adsorbing steps are accomplished by washing a solution of said first species or said chromophore over said substrate.

46. The method of claim 30 further comprising the step of removing said substrate after steps a)–d) are completed.

47. The method of claim 34 wherein said monomeric chromophore comprises i) chemical moieties capable of covalently bonding to said first species layer or said repeat first species layer; and ii) chemical moieties capable of binding ionically to said first species layer or said repeat first species layer.

48. The method of claim 47 wherein said chemical moieties capable of covalently bonding comprise one or more triazine rings.

49. The method of claim 48 wherein said chemical moieties capable of binding ionically are ionizable groups selected from the group consisting of sulfonate, phosphate, carboxylate, and quaternary ammonium.

* * * * *